(12) United States Patent
Danby et al.

(10) Patent No.: US 7,886,528 B2
(45) Date of Patent: Feb. 15, 2011

(54) SYSTEM FOR CONTROLLING EXHAUST AFTERTREATMENT

(75) Inventors: Susannah Elizabeth Danby, Peterborough (GB); Stephen Anthony Faulkner, Stamford (GB); David Mark Heaton, Nr Peterborough (GB); Robert Southall, St Neots (GB)

(73) Assignee: Perkins Engines Company Limited, Peterborough (GB)

( * ) Notice: Subject to any disclaimer, the term of this patent is extended or adjusted under 35 U.S.C. 154(b) by 108 days.

(21) Appl. No.: 12/073,169

(22) Filed: Feb. 29, 2008

(65) Prior Publication Data
US 2009/0217646 A1    Sep. 3, 2009

(51) Int. Cl.
F01N 3/00    (2006.01)

(52) U.S. Cl. .............................. 60/286; 60/274; 60/278; 60/295; 60/301; 60/303

(58) Field of Classification Search ............... 60/274, 60/278, 285, 286, 301, 303
See application file for complete search history.

(56) References Cited

U.S. PATENT DOCUMENTS

| | | | |
|---|---|---|---|
| 3,885,538 A | 5/1975 | Suter | |
| 3,911,674 A | 10/1975 | Goto et al. | |
| 3,992,878 A | 11/1976 | Moorman | |
| 4,183,212 A | 1/1980 | Takagi | |
| 4,202,173 A | 5/1980 | Wakita et al. | |
| 5,845,487 A | 12/1998 | Fraenkle et al. | |
| 6,089,017 A | 7/2000 | Ogawa et al. | |
| 6,173,568 B1 | 1/2001 | Zürbig et al. | |
| 6,470,676 B2 | 10/2002 | Dölling et al. | |
| 6,619,035 B2 * | 9/2003 | Matsuoka et al. | ............. 60/286 |
| 7,263,823 B2 | 9/2007 | Andrews et al. | |
| 7,266,943 B2 | 9/2007 | Kammel | |
| 2005/0223699 A1 | 10/2005 | Ancimer et al. | |
| 2007/0163244 A1 | 7/2007 | Federle | |

FOREIGN PATENT DOCUMENTS

| | | |
|---|---|---|
| EP | 1431533 | 6/2004 |
| EP | 1653058 | 5/2006 |
| EP | 1712764 | 10/2006 |
| JP | 10-141048 | * 5/1998 |
| JP | 10141048 | 5/1998 |
| WO | 2007120126 | 10/2007 |
| WO | 2008009940 | 1/2008 |

* cited by examiner

Primary Examiner—Thomas E Denion
Assistant Examiner—Diem Tran
(74) Attorney, Agent, or Firm—Finnegan, Henderson, Farabow, Garrett & Dunner LLP

(57) ABSTRACT

In one aspect, the present disclosure is directed to a method for treating exhaust from an engine. The method may comprise generating a first signal indicative of an engine load and generating a second signal indicative of a pollutant level. The method may further comprise recirculating exhaust based on the first signal and injecting a reductant based on the first signal and the second signal.

22 Claims, 4 Drawing Sheets

SYSTEM FOR CONTROLLING EXHAUST AFTERTREATMENT

TECHNICAL FIELD

This disclosure relates generally to exhaust aftertreatment and, more particularly, to a system for controlling exhaust aftertreatment.

BACKGROUND

Internal combustion engines, including diesel engines, gasoline engines, gaseous fuel-powered engines, and other engines known in the art exhaust a complex mixture of air pollutants. These air pollutants may be composed of gaseous compounds such as, for example, the oxides of nitrogen (NOx), unburned hydrocarbons, and particulate matter. Due to increased awareness of the environment, exhaust emission standards have become more stringent, and the amount of NOx and particulate matter emitted from an engine may be regulated depending on the type of engine, size of engine, and/or class of engine. Two strategies that may be used to ensure compliance with the regulations are exhaust gas recirculation (EGR) systems and selective catalytic reduction (SCR) systems.

EGR systems are used for controlling emissions of undesirable pollutant gases and particulates during operation of an internal combustion engine. Such systems have proven particularly useful in internal combustion engines used in motor vehicles such as passenger cars, trucks, and other on-road machines. EGR systems generally recirculate exhaust gas into an intake air supply of the internal combustion engine. The exhaust gas reintroduced to the engine cylinder reduces the concentration of oxygen in the cylinder, which lowers the maximum combustion temperature, slows the chemical reaction of the combustion process, and decreases the formation of nitrous oxides ($NO_x$). Furthermore, the exhaust gas typically contains unburned hydrocarbons which are burned after reintroduction into the engine cylinder further reducing the emission of undesirable pollutants from the internal combustion engine.

SCR is a process where gaseous or liquid reductant (most commonly urea) is added to the exhaust gas stream of an engine and is absorbed onto a catalyst. The reductant reacts with NOx in the exhaust gas to form $H_2O$ and $N_2$. One system for selective catalytic reduction is described in U.S. Pat. No. 6,470,676 (the '676 patent), issued to Dölling et al. Specifically, the '676 patent describes a method for catalytic conversion of NOx. A reducing agent is added to the exhaust gas from an engine as a function of the NOx concentration and the operating condition of the engine. If the operating conditions of the engine indicate that less reducing agent is needed, an increased amount of reducing agent is temporarily added to the exhaust which is then stored on the catalyst. When the operating conditions of the engine indicate that more reducing agent is needed, the excess reducing agent that has been stored on the catalyst may be utilized to convert the added NOx until more reducing agent can be added to the system.

While EGR systems may be effective at reducing undesirable pollutants and particulates, they may cause increased cylinder pressure and fuel consumption at high loads, and may increase exhaust temperature requiring relatively large heat exchangers to cool the exhaust before reintroduction into the engine. Furthermore, while prior art systems may be effective at reducing NOx emissions, they may not be the most effective choice across a wide range of engine loads. At low loads, the temperature of the exhaust gas is low and the efficiency of the SCR catalyst is reduced. Furthermore the extensive use of a reducing agent would require a large amounts of storage or alternatively a reduced operating time.

The disclosed exhaust aftertreatment system is directed to improving prior art systems.

SUMMARY

In one aspect, the present disclosure is directed to a method for treating exhaust from an engine. The method may comprise generating a first signal indicative of an engine load and generating a second signal indicative of a pollutant level. The method may further comprise recirculating exhaust based on the first signal and injecting a reductant based on the first signal and the second signal.

In another aspect, the present disclosure is directed to an exhaust aftertreatment system for an engine. The system may comprise an exhaust gas recirculation system and a selective catalytic reduction system having a reductant injector. The system may further comprise a valve configured to direct the flow of exhaust and a sensor configured to generate a signal indicative of an engine load. The system may also include a controller, in communication with the valve and the sensor, configured to affect the direction of the flow of the exhaust based on the signal and to affect injection of a reductant based on the signal.

DETAILED DESCRIPTION

Figure 1:
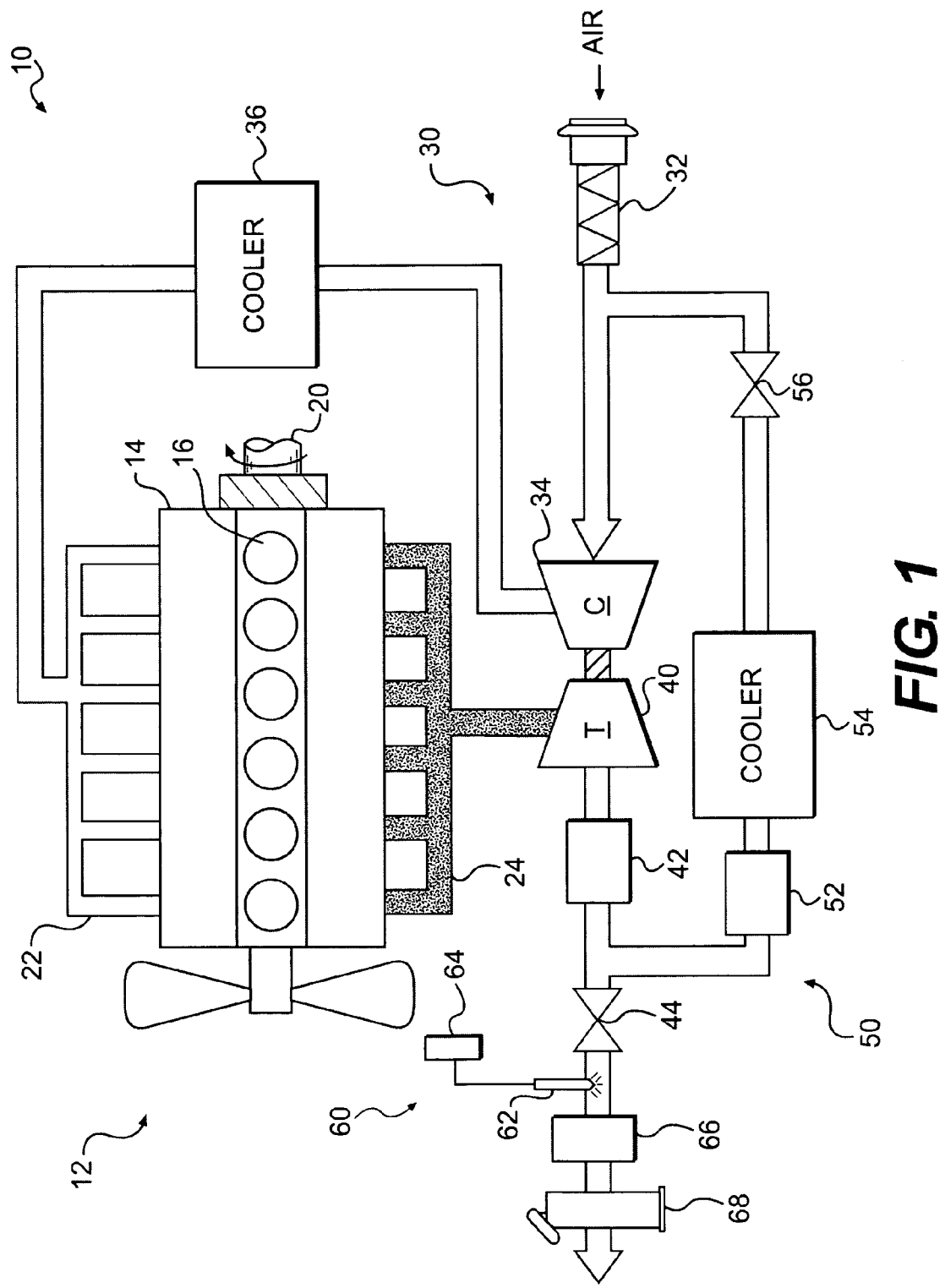
FIG. 1 is a diagrammatic illustration of an exemplary disclosed power system.

FIG. 1 illustrates an exemplary power system 10. Power system 10 is described herein with respect to a diesel-fuel, internal combustion engine 12 for exemplary purposes only. However, it is contemplated that engine 12 may embody any other type of internal combustion engine, such as, for example, a gasoline or gaseous fuel-powered engine. Engine 12 may include an engine block 14 at least partially defining a plurality of cylinders 16. Each cylinder 16 may be associated with a fuel injector, a cylinder liner, at least one air intake port 22 and corresponding intake valve (not shown), at least one exhaust port 24 and corresponding exhaust valve (not shown), a combustion chamber, and a reciprocating piston assembly moveable within each cylinder 16. It is contemplated that engine 12 may include any number of cylinders 16 and that cylinders 16 may be disposed in an "in-line" configuration, a "V" configuration, or any other conventional configuration. A crankshaft 20 of engine 12 may be rotatably disposed within engine block 14.

Power system 10 may be used with a machine. The machine may embody a mobile or stationary machine that performs some type of operation associated with an industry such as mining, construction, farming, transportation, or any other industry known in the art. For example, the machine may be an earth moving machine such as an off-highway haul truck, a wheel loader, a motor grader, or any other suitable earth moving machine. The machine may alternatively embody an on-highway vocational truck, a passenger vehicle, or any other operation-performing machine.

Power system 10 may include an air induction system 30. Air induction system 30 may be associated with power system 10 and may include components that condition and introduce compressed air into cylinder 16 by way of intake port 22 and the intake valve. For example, air induction system 30 may include an air filter 32, a compressor 34 connected to draw inlet air through air filter 32, and an air cooler 36 located downstream of compressor 34. It is contemplated that air induction system 30 may include different or additional components such as, for example, inlet bypass components, a throttle valve, and other components known in the art.

Air filter 32 may be configured to remove or trap debris from air flowing into power system 10. For example, air filter 32 may include a full-flow filter, a self-cleaning filter, a centrifuge filter, an electro-static precipitator, or any other type of air filtering device known in the art. It is contemplated that more than one air filter 32 may be included within air induction system 30 and disposed in a series or parallel arrangement. Air filter 32 may be connected to inlet port 22.

Compressor 34 may be located downstream of air filter 32 and configured to compress the air flowing into power system 10. Compressor 34 may embody a fixed geometry type compressor, a variable geometry type compressor, or any other type of compressor known in the art. It is contemplated that more than one compressor 34 may be included within air induction system 30 and disposed in parallel or in series relationship. Air cooler 36 may be configured to cool air within air induction system 30 upstream of cylinders 16 and may include a liquid-to-air heat exchanger, an air-to-air heat exchanger, or any other type of heat exchanger known in the art for cooling air.

Power system 10 may further include an exhaust gas recirculation system (EGR) 50. EGR 50 may include components that condition and direct exhaust from cylinder 16 by way of exhaust port 24 and the exhaust valve. For example, EGR 50 may include a turbine 40 driven by the exiting exhaust, a particulate filter 42, a valve 44 and an exhaust outlet 66 configured to direct treated exhaust to the atmosphere, a flow meter 52, an exhaust cooler 54, and a valve 56 configured to selectively pass or restrict the flow of exhaust through EGR 50. It is contemplated that EGR 50 may include different or additional components than described above such as, for example, exhaust bypass components, an exhaust braking system, and other components known in the art.

Turbine 40 may be located to receive exhaust leaving power system 10 via exhaust port 24. Turbine 40 may be connected to compressor 34 of air induction system 30 by way of a common shaft to form a turbocharger. As the hot exhaust gases exiting power system 10 move through turbine 40 and act upon turbine 40, i.e. expand against vanes (not shown), turbine 40 may rotate and drive compressor 34 to pressurize inlet air. It is contemplated that more than one turbine 40 may be included within EGR 50 and disposed in parallel or in series relationship.

Particulate filter 42 may be disposed downstream of turbine 40 to remove particulates from the exhaust flow directed from power system 10. It is contemplated that particulate filter 42 may include electrically conductive or non-conductive coarse mesh elements. It is also contemplated that particulate filter 42 may include a catalyst for reducing an ignition temperature of the particulate matter trapped by particulate filter 42, a regeneration system that may regenerate the particulate matter trapped by particulate filter 42, or both a catalyst and a regeneration system. The catalyst may support the reduction of HC, CO, and/or particulate matter, and may include, for example, a base metal oxide, a molten salt, and/or a precious metal. The regeneration system may include, among other things, a fuel-powered burner, an electrically-resistive heater, an engine control strategy, or any other means for regenerating known in the art. It is contemplated that particulate filter 42 may be selectively omitted.

EGR 50 may also include flow meter 52 and exhaust cooler 54. Flow meter 52 may be configured to measure exhaust flow and may embody, for example, a thermal mass flow meter, a laminar flow element, a mass compensated positive displacement roots meter, or any other suitable device configured to measure gaseous flows. Exhaust cooler 54 may be disposed downstream of particulate filter 42 and configured to cool the portion of exhaust flowing through EGR 50. Exhaust cooler 54 may include a liquid-to-air heat exchanger, an air-to-air heat exchanger, or any other type of heat exchanger known in the art for cooling an exhaust flow. It is contemplated that exhaust cooler 54 may be selectively omitted.

Power system 10 may also include a selective catalytic reduction system (SCR) 60. SCR 60 may include components to condition and direct exhaust from cylinder 16 by way of exhaust port 24 and the exhaust valve. SCR 60 may include a reductant supply 64, an injector 62 connected to the reductant supply 64, and a catalyst 66. The reductant may be drawn from reductant supply 64, and sprayed by injector 62 onto catalyst 66. Reductant supply 64 may be fluidly connected to injector 62. The reductant contained in reductant supply 64 may be gaseous, liquid, or solid, and may be any reductant known in the art, such as, for example, urea, ammonia, or a hydrocarbon reductant. Injector 62 may inject reductant from reductant supply 64 into selective catalytic reduction system 60 to reduce the concentration of a constituent therein. For example, to reduce the concentration of an oxide of nitrogen (NOx) by reacting with the NOx in the exhaust and catalyst 66 to form $H_2O$ and $N_2$.

Catalyst 66 may be disposed in SCR 60 such that the exhaust stream flows through catalyst 66 in a substantially equally distributed manner and causes the constituent to contact and react with the reductant. Catalyst 66 may be made from a variety of materials. For example, catalyst 66 may include a support material and a metal promoter dispersed within the catalyst support material. The support material may include at least one of alumina, zeolite, aluminophosphates, hexaluminates, aluminosilicates, zirconates, titanosilicates, and titanates, and the metal promoter may include silver (Ag). Combinations of these materials may be used, and the support material may be chosen, based on the type of fuel used, the reductant used, the air to fuel-vapor ratio desired, and/or for conformity with environmental standards. One of ordinary skill in the art will recognize that numerous other catalyst compositions, including catalyst compositions usable with a hydrocarbon reductant, may be used without departing from the scope of this disclosure. Further, multiple catalytic devices may also be included with SCR 60.

Figure 2:
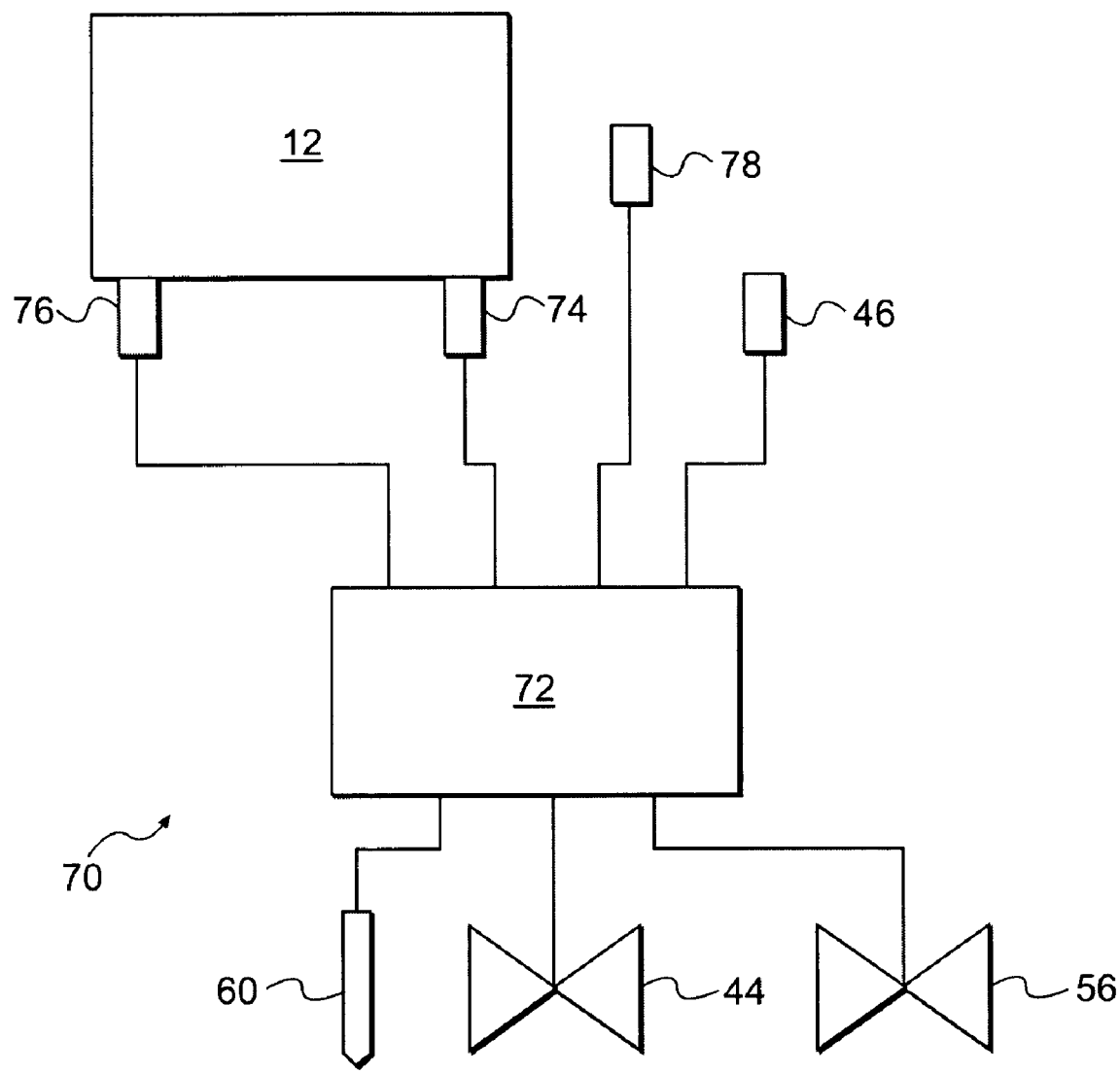
FIG. 2 is a diagrammatic illustration of a control system that may be used with the power system of FIG. 1.

As illustrated in FIG. 2, power system 10 may include control system 70 configured to determine operational characteristics of power system 10 and to control the flow of the exhaust. Specifically, control system 70 may regulate flow of exhaust through EGR 50 and may control the injection of reductant from the injector 62 into the SCR 60. In particular, control system 70 may include a controller 72 configured to receive signals generated by air-to-fuel ratio sensor 74, a cylinder pressure sensor 76, a fuel consumption sensor 78, and a pollutant sensor 46, and in response, affect the operation of valve 44, valve 56, and injector 62.

Controller 72 may include a single microprocessor or multiple microprocessors that include a manner for controlling an operation of power system 10. Numerous commercially available microprocessors can be configured to perform the functions of controller 72. It should be appreciated that controller 72 could readily embody a general microprocessor capable of controlling numerous functions of power system 10. Controller 72 may include a memory, a secondary storage device, a processor, and other components for running an application. Various other circuits may be associated with controller 72 such as power supply circuitry, signal conditioning circuitry, solenoid driver circuitry, and other types of circuitry.

One or more electronic maps relating to engine load may be stored within the memory of controller 72. Each of these maps may be in the form of tables, graphs, and/or equations and include a compilation of data collected from lab and/or field operation of power system 10. The maps may relate an engine load to a parameter such as, for example, an air-to-fuel ratio, a cylinder pressure, or a fuel consumption. The maps may relate a portion of exhaust to recirculate through EGR 50 to an engine load. The maps may relate an amount of reductant to be injected to one of a pollutant level and an engine load. Controller 72 may access these maps and affect the operation of power system 10 accordingly.

Figure 3:
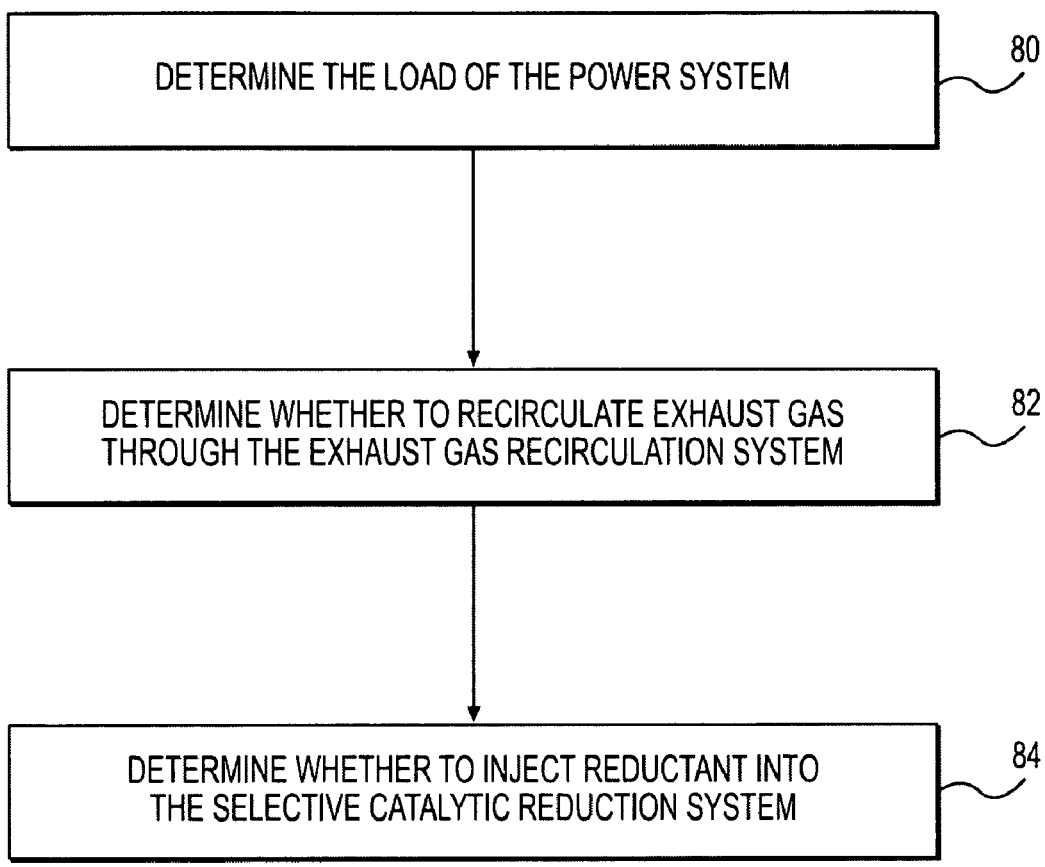
FIG. 3 is a flow diagram illustrating an exemplary disclosed method of operating the control system of FIG. 2.

FIG. 3 shows a flow-diagram illustrating a method of controlling EGR 50 and SCR 60. FIG. 3 will be discussed in greater detail below.

Figure 4:
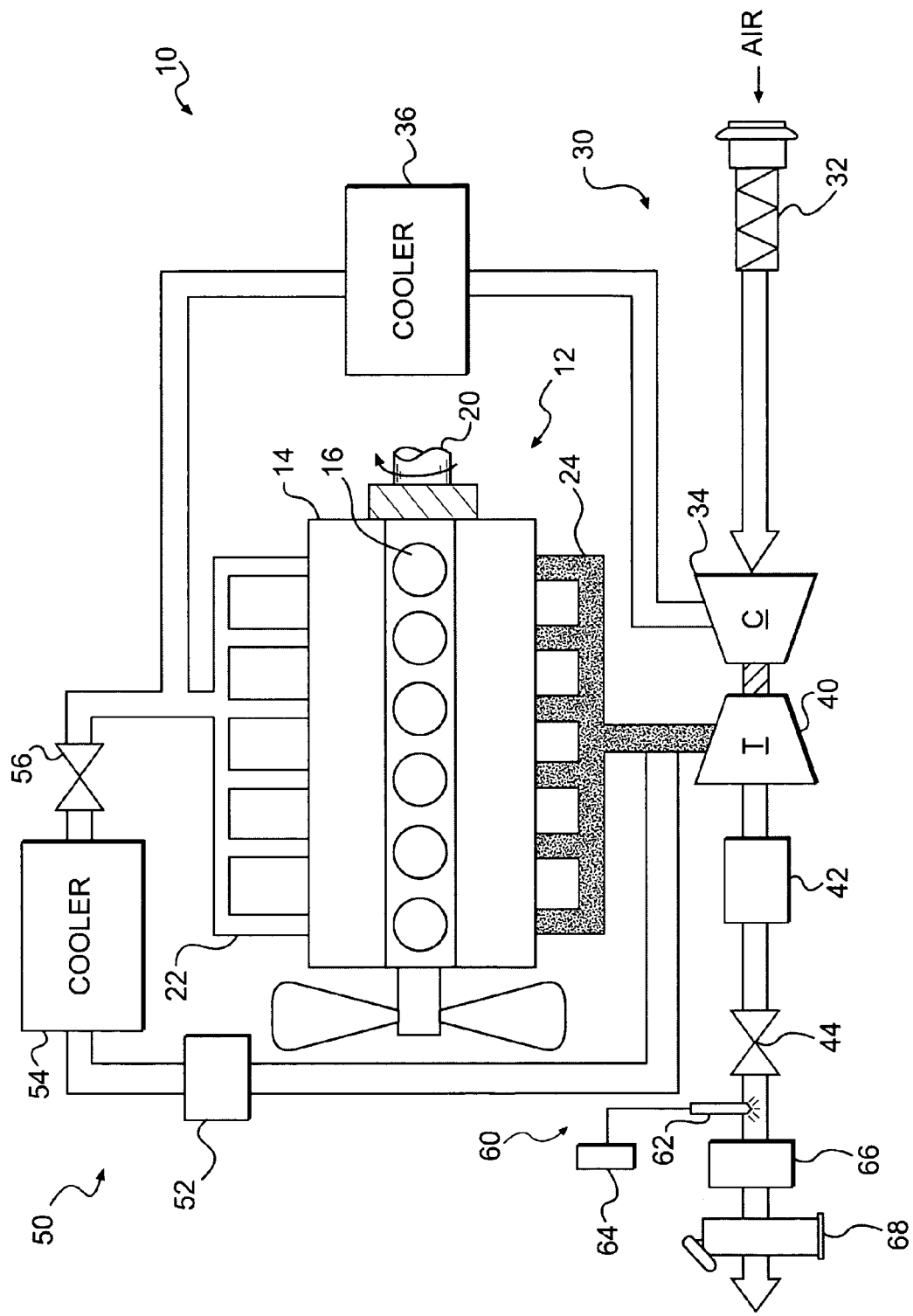
FIG. 4 is a diagrammatic illustration of an alternative exemplary power system of FIG. 1.

FIG. 4 illustrates an alternative power system 10. Similar to power system 10 of FIG. 1, power system 10 of FIG. 4 may include EGR 50 and SCR 60. However, in contrast to power system 10 of FIG. 1, EGR 50 of FIG. 4 may direct exhaust from upstream of turbine 40 to downstream of compressor 34 and air cooler 36.

INDUSTRIAL APPLICABILITY

The disclosed exhaust aftertreatment system may be applicable to any power system having an exhaust gas recirculation system (EGR) and a selective catalytic reduction system (SCR), and may include the performance of the EGR and SCR. The disclosed system selectively operates the EGR at low and medium loads and the SCR at medium and high loads to optimize each system and to improve NOx reduction over either system alone.

Atmospheric air may be drawn into air induction system 30 via air filter 32 and may be directed through compressor 34 where it may be pressurized to a predetermined level before entering the combustion chamber of engine 12. Fuel may be mixed with the pressurized air before or after entering the combustion chamber of engine 12. The fuel and air mixture may be ignited by engine 12 to produce mechanical work and an exhaust flow containing gaseous compounds. The exhaust flow may be a fluid that may also contain solid particulate matter and pollutants such as, for example, carbon, sulfur, and NOx. The exhaust flow may be directed from engine 12 to turbine 40 where the expansion of hot exhaust gases may cause turbine 40 to rotate, thereby rotating connected compressor 34 to compress the inlet air. After exiting turbine 40 the exhaust may flow through particulate filter 42.

Control system 70 may regulate the flow of exhaust and the quantity of reductant to inject based on signals received from sensors 46, 74, 76, and 78, valves 44 and 56, and injector 62. Control system 70 may affect the operation of power system 10, more particularly, valve 44, valve 56, and injector 62, to regulate the flow of exhaust through SCR 60 and EGR 50. The exhaust may flow through SCR 60 based on the positions of valves 44 and 56. Exhaust that may flow through SCR 60 may pass through catalyst 66 and injector 62 may inject urea, stored in reductant supply 64, such that the reductant reacts with the NOx in the presence of catalyst 66 to form $H_2O$ and $N_2$. The exhaust may then exit power system 10 via outlet 68.

The exhaust may flow through EGR 50 based on the positions of valves 44 and 56. Exhaust that may flow through EGR 50 may pass though flow meter 52 and exhaust cooler 54 before being reintroduced into air induction system 30.

FIG. 3 is a flow diagram illustrating an exemplary disclosed method for operating an exhaust aftertreatment control system. Controller 72 may determine the load of power system 10 based on a signal indicative of at least one of an air-to-fuel ratio received from sensor 74, a cylinder pressure received from sensor 76, or a fuel consumption received from sensor 78 (Step 80). Power system 10 may operate at loads at or below a first value indicative of a given engine load. Power system 10 may operate at loads at or above a second value indicative of a second given engine load. Power system 10 may operate at loads between the first value and the second value. It is contemplated that the first value may equal the second value.

Controller 72 may then determine whether to recirculate exhaust through EGR 50 based on a determination that power system 10 may be operating below the second value indicative of a given engine load (Step 82). Controller 72 may then cause the positions of valves 44 and 56 to change such that at least a portion of the exhaust flows through EGR 50. Controller 72 may access an electronic map to determine the portion of exhaust to recirculate through EGR 50. It is further contemplated that controller 72 may recirculate exhaust through EGR 50 only when the load of power system 10 is below the second value or, alternatively, at any load.

Controller 72 may then determine whether to inject reductant into SCR 60 based on a determination that power system 10 may be operating above the first value indicative of a given engine load (Step 84). Controller 72 may then cause reductant to be drawn from reductant supply 64 and be injected by injector 62 onto catalyst 66 or into the exhaust upstream of catalyst 66. Controller 72 may access an electronic map to determine an amount of reductant to inject into SCR 60. Controller 72 may inject reductant into SCR 60 only when the load of power system 10 is above the first value or, alternatively, at any load.

Several advantages may be associated with the currently disclosed aftertreatment system. By operating the EGR at low and medium loads, the power system may benefit from the EGR without having excessive cylinder pressures, air-fuel-ratios, or fuel consumption associated with EGR at high loads. Furthermore the exhaust being recirculated through the EGR may be cooler and may require smaller heat exchangers to cool the exhaust before reintroduction into the engine. By operating the SCR at medium and high loads, the power system may benefit from pollutant reduction with minimal or no use of the EGR. Furthermore, by selectively employing the SCR, less reductant storage may be required.

It will be apparent to those skilled in the art that various modifications and variations can be made to the aftertreatment system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for treating exhaust from an engine, comprising:

generating a first signal indicative of an engine load;
generating a second signal indicative of a pollutant level;
recirculating exhaust based on the first signal; and injecting a reductant based on the first signal and the second signal;

wherein the reductant is injected only when the first signal indicates an engine load above a first value.

2. The method of claim 1, wherein the first signal is indicative of at least one of an air-to-fuel ratio, a cylinder pressure, or a fuel consumption.

3. The method of claim 1, further including determining an amount of reductant to inject based on the second signal.

4. The method of claim 1, wherein a portion of the exhaust is recirculated only when the first signal indicates an engine load below a second value, the first value being lower than the second value.

5. The method of claim 1, wherein the exhaust is recirculated only when the first signal indicates an engine load below a second value.

6. The method of claim 1, wherein the pollutant level relates to an amount of at least one of carbon, sulfur, oxides of nitrogen (NOx), unburned hydrocarbons, and particulate matter.

7. The method of claim 1, wherein a portion of the exhaust is recirculated only when the first signal indicates an engine load below a second value, the first value being equal to or lower than the second value.

8. The method of claim 1, wherein a portion of the exhaust is recirculated when the first signal indicates an engine load below a second value.

9. The method of claim 8, further including determining the portion of the exhaust to be recirculated based on the engine load.

10. An exhaust aftertreatment system for an engine, comprising:

an exhaust gas recirculation system;

a selective catalytic reduction system having a reductant injector;

a valve configured to affect the flow of exhaust;

a sensor configured to generate a signal indicative of an engine load; and a controller in communication with the valve and the sensor, and being configured to affect the flow of the exhaust based on the signal and to affect injection of a reductant based on the signal;

wherein the controller is configured to control the valve to allow a portion of the exhaust through the exhaust gas recirculation system only when the signal indicates an engine load below a first value.

11. The system of claim 10, wherein the signal is indicative of at least one of an air-to-fuel ratio, a cylinder pressure, or a fuel consumption.

12. The system of claim 10, wherein the reductant is injected into the selective catalytic reduction system when the signal indicates an engine load above a second value.

13. The system of claim 12, wherein the controller is configured to determine an amount of reductant to inject by accessing an electronic map stored in a memory, functionally relating pollutant level and amount of reductant.

14. The system of claim 10, wherein the controller is configured to determine the portion of exhaust to be allowed through the exhaust gas recirculation system by accessing an electronic map stored in a memory, functionally relating engine load and portion of exhaust to be recirculated.

15. The system of claim 10, further including a pollutant level sensor configured to generate a signal indicative of a pollutant level in the flow of the exhaust.

16. The system of claim 10, wherein the controller is further configured to inject reductant into the selective catalytic reduction system only when the signal indicates an engine load above a second value.

17. The system of claim 16, wherein the first value is greater than the second value.

18. The system of claim 16, wherein the first value is equal to or greater than the second value.

19. A power system, comprising:

an engine having a combustion chamber;

an exhaust gas recirculation system;

a selective catalytic reduction system having a reductant injector;

a valve configured to selectively direct the flow of exhaust;

a first sensor configured to generate a first signal indicative of an engine load; and a controller in communication with the first sensor and the valve, and being configured to affect the direction of the flow of the exhaust based on the first signal and to affect injection of a reductant based on the first signal;

wherein the controller is configured to control the injector to inject reductant into the selective catalytic reduction system only when the first signal indicates an engine load above a first value.

20. The system of claim 19, wherein the engine load is based on one of an air-to-fuel ratio, a cylinder pressure, or a fuel consumption.

21. The system of claim 19, further including a second sensor in communication with the controller and being configured to generate a second signal indicative of a pollutant level and wherein the controller is further configured to affect injection of the reductant based on the second signal.

22. The system of claim 19, wherein the controller is further configured to direct a portion of the exhaust through the exhaust gas recirculation system only when the first signal indicates an engine load below a second value.

* * * * *